D. KRUSSAND & A. STEEN.
VEHICLE WHEEL AND THE LIKE.
APPLICATION FILED MAR. 27, 1917.
1,267,877.
Patented May 28, 1918.
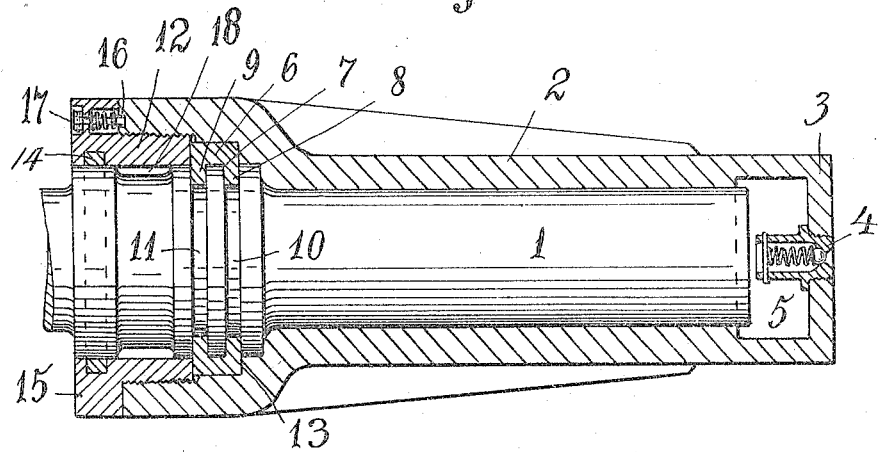
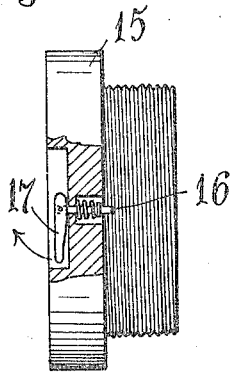
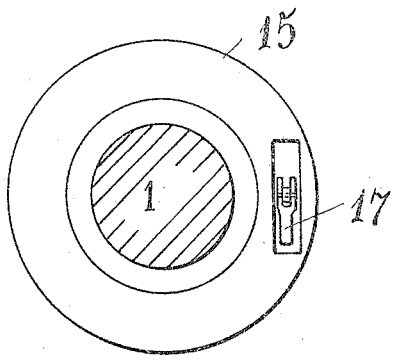

UNITED STATES PATENT OFFICE.

DANIEL KRUSSAND, OF DRAMMEN, AND ARNE STEEN, OF CHRISTIANIA, NORWAY.

VEHICLE-WHEEL AND THE LIKE.

1,267,877.      Specification of Letters Patent.    Patented May 28, 1918.

Application filed March 27, 1917. Serial No. 157,713.

*To all whom it may concern:*

Be it known that we, DANIEL KRUSSAND, a subject of the King of Norway, residing at Drammen, Norway, and ARNE STEEN, a subject of the King of Norway, residing at Christiania, Norway, have invented certain new and useful Improvements in Vehicle-Wheels and the like; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to an improved hub attaching device for vehicle wheels and comprises a hub and trunnion, which are so arranged and combined, that they can easily be taken apart, while at the same time no dust or impurities can enter into the bearing, the same being entirely closed at the end.

On the drawings:

Figure 1 is a longitudinal sectional view of a form of the invention.

Fig. 2 is a partly sectional view of a detail.

Fig. 3 shows the bearing illustrated in Fig. 1 seen from the left hand side.

In Fig. 1, 1 is the trunnion and 2 the wheel hub inclosing the same. This wheel hub 2 is closed at its outer end 3 except for a non return oiling valve 4 which leads into an oil chamber 5. Near its inner end the hub is provided with an annular body 6 in two or more parts, the inside of which is provided with a groove 7 giving it a U-shaped cross section.

The two inwardly projecting ribs 8—9 of this annular body fit into grooves 10—11 of the trunnion 1 thus acting as a thrust bearing for the trunnion.

The annular body 6 is kept in place by means of a threaded bushing 12 engaging screw threads on the inside of hub 2 and pressing the annular body 6 against a shoulder 13 in the hub. The bushing 12 is provided near its outer end with a dust guard in the form of a felt ring or the like 14 fitted into a groove in the bushing and pressing against the trunnion.

As a further security against the entrance of impurities the trunnion is provided with a dust collecting groove 18 between the felt ring 14 and the annular body 6.

To secure it against disengagement the bushing 12 is provided with a radial flange 15 as seen in Fig. 2, said flange having an outside diameter corresponding to the outside diameter of the hub 2 and being provided with a spring actuated locking pin 16 engaging a hole in the end face of hub 2. Said spring actuated locking pin as shown in Figs. 2 and 3 may be brought out of engagement with its hole by means of an eccentric lever 17, which may easily be gripped by a finger.

The axle bearing above described is dismounted by turning the lever 17 and unscrewing bushing 12, whereafter the wheel with its hub may be taken off. The lubrication takes place from the outside and accidental loosening of the wheel as well as entrance of impurities into the bearing is practically impossible.

Claim.

A hub attaching device for vehicle wheels comprising a hub closed at its outer end, a trunnion projecting into said hub, an annular body formed of a plurality of parts located inside said hub, a screw threaded bushing for keeping said annular body in position, a plurality of inwardly projecting annular ribs on said annular body, said ribs fitting into grooves in the trunnion inclosed by the hub, and a dust collecting groove in the trunnion between said grooves and the open end of the hub.

In testimony that we claim the foregoing as our invention, we have signed our names in presence of two subscribing witnesses.

DANIEL KRUSSAND.
       ARNE STEEN.

Witnesses:
  C. NORMAN,
  THS. BERG.

Copies of this patent may be obtained for five cents each, by addressing the "Commissioner of Patents, Washington, D. C."